(No Model.)

L. H. OLMSTED.
MITER BOX.

No. 339,455. Patented Apr. 6, 1886.

Witnesses:
Henry Eichling
Frank A. Olmsted

Inventor
L. H. Olmsted

UNITED STATES PATENT OFFICE.

LEVERETT H. OLMSTED, OF CORONA, NEW JERSEY.

MITER-BOX.

SPECIFICATION forming part of Letters Patent No. 339,455, dated April 6, 1886.

Application filed December 24, 1885. Serial No. 186,647. (No model.)

*To all whom it may concern:*

Be it known that I, LEVERETT HOMER OLMSTED, a citizen of the United States, residing at Corona, in the county of Bergen and State of New Jersey, have invented a new and useful Miter-Box, of which the following is a specification.

My invention relates to improvements in miter-boxes which are used by carpenters and cabinet-makers to saw off moldings and boards at an angle of forty-five degrees, so that when the ends which are sawed are placed together the two pieces will be at right angles to each other or form a square.

The usual method adopted in constructing miter-boxes is to use three pieces of board, one of which is used for a bottom. The other two are made fast to the edges of the bottom board by screws or otherwise—one being fastened to each edge—thus forming a frame. Two slots are then made in these upright side pieces at an angle to its sides of forty-five degrees. These slots serve as guides for the saw. It is self-evident that miter-boxes constructed in this manner will soon wear away in the slots by the action of the saw.

The objects of my improvement are, first, to provide a miter-box the frame of which is made of wood, with guides for the saw made of iron or other suitable metal; second, to afford facilities for holding the miter-box firmly on a bench or table without screwing it down; third, to provide means to prevent the upright pieces of the miter-box from warping from the action of the atmosphere. I attain these objects by the mechanism illustrated in the accompanying drawings, in which—

Figure 1:
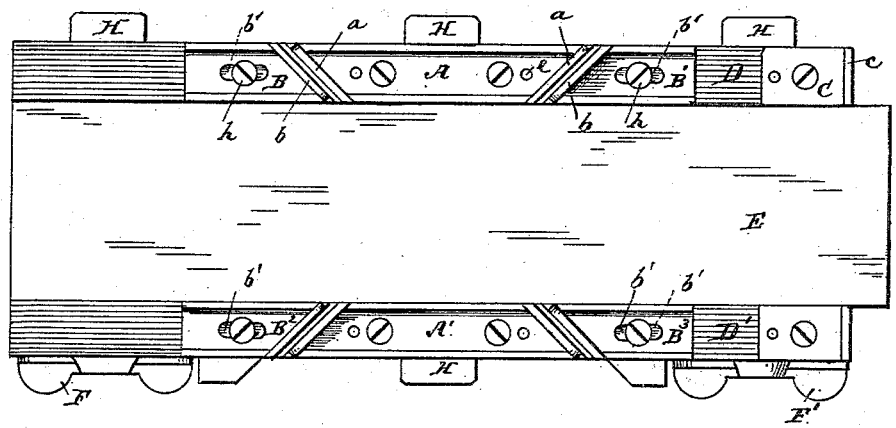
Figure 2:
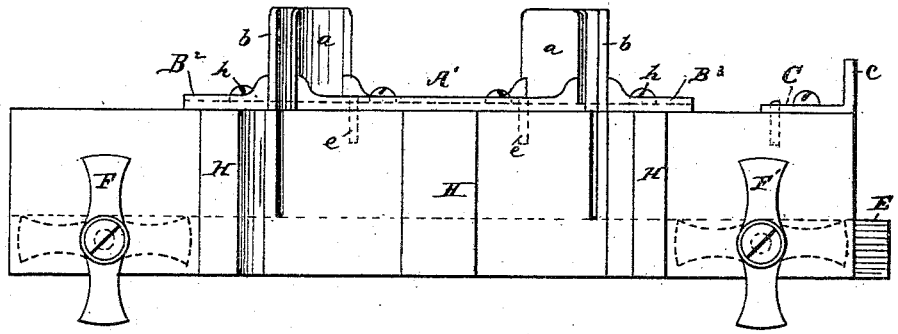

Figure 1 is a top view. Fig. 2 is a side view.

Similar letters refer to similar parts throughout the several views.

The bottom plate, E, and the upright side pieces, D D', constitute the frame of the miter-box, the upright side pieces having slots in them down to the bottom board, the slots being sawed at an angle of forty-five degrees to their sides.

Upon the upper edge of each of the upright sides are secured pieces of iron A A', the ends of which are formed at an angle of forty-five degrees to these sides, and are placed in a position close to and to correspond with the slots in the frame. These irons are retained in position by the screws $h$ and pins $e$. At each end of these two irons are placed other irons, B B' B² B³, one end of each being formed at an angle of forty-five degrees, to correspond with the angle of the ends of the irons A A'. These irons, when placed as described, form a guide for the saw.

The irons B B' B² B³ are made fast to the upper edges of the frame by screws $h$. The apertures $b'$, through which the screw passes, through these irons, are elongated, so that they may be moved up to or from the irons A A for the purpose of adjusting the width of the space or slot between the irons A A' and B to fit any thickness of saw-blade.

When adjusted so that there is only sufficient space between the irons for the saw to move freely, the saw will be held in a perfectly upright position, and the saw cannot cut away the slots in the frame, the ends of these irons being made quite high and broad for this purpose, as seen at $a$ $b$.

When placing the saw into the slots in the miter-box, the teeth of the saw are always entered below the irons.

Upon the upper edge and at one end of each of the upright side pieces are securely fastened irons C, and are for the purpose to serve as guides for the saw when sawing a square cut.

The usual method used to form a guide for the saw in sawing a square cut is to make slots in the upright sides at right angle to the sides of the miter-box. By using the irons C for guides, the saw is placed against them, thereby making it more expeditious than to enter the saw in a slot, and admits of making the miter-box shorter and less cumbersome.

The bottom plate, E, is extended out beyond the two upright side pieces a short distance at the end where the irons C are placed, for the purpose of forming a support for the piece of wood which is being sawed, and to serve as a stop for the saw after it has passed through the wood. To one of the upright sides, and at each end, near the lower edge, are placed two buttons, F F', which are used for the purpose when turned vertically to form a stop or catch when the miter-box is used near the edge of a table or bench, one hand being used to hold the miter-box down on the table, while the two buttons rest against the edge of it and prevent the miter-box from moving with the saw. By turning the buttons horizontal the miter-box can be fastened down to any part of a table or bench.

To the outside of the upright sides of the miter-box are rigidly fastened iron plates H, which serve the purpose of keeping the wood of which the upright sides are composed from warping.

The saw-guides A A' may each be made in two separate pieces, and in making large miter-boxes I do so make them. When made in two separate pieces, the form of them is like the saw-guides B, &c.

When the saw-guides A A' are each made in two pieces, the aperture through which the screw passes to fasten them to the miter-box may be elongated, like the saw-guides B, and be moved up to and from the saw-guides B, thereby adjusting the space between the irons to any thickness of saw-blade.

I do not wish to be understood as confining myself to making the ends of the saw-guides at an angle of forty-five degrees, for I purpose to make them at other angles for miter-box frames which are made to saw at other angles.

A sliding bolt can be used to push down below the bottom of the miter-box to serve as a catch or stop, and be pushed up when it is desired to fasten the miter-box to any part of a bench or table in place of turning the buttons F.

In the saw-guides B, &c., the aperture through which the screw passes, instead of being elongated, as shown at $b$, a round hole larger than the screw with which the saw-guide is fastened to the frame can be made, which would serve the purpose of allowing them to be adjusted to any thickness of saw-blade. These saw-guides can be attached to a metallic frame, if desired.

What I claim as my invention, and desire to secure by Letters Patent, is—

1. A miter-box having angular slots, the upper walls of said slots being formed of metal plates secured to the box and separated by a space less than the width of the slot below said plates, as set forth.

2. The combination, with a miter-box, as described, of metal plates having vertical extensions, as $a\ b$, secured to the upper surface of the slotted sides and having bearing-faces corresponding to the angle of the slots, as set forth.

3. The combination, with a miter-box, as described, of metal plates secured to the top or upper surface of the slotted sides, having bearing-faces corresponding to the angle of the slots and arranged in pairs, and provisions for adjusting one plate of each pair to accommodate different thicknesses of saw-blade, as set forth.

4. The combination, with a miter-box, as described, having angular slots or kerfs, as shown, of metal plates having upward extensions and bearing-faces corresponding with the angles of the slots, the said plates being applied to the sides of the box and arranged in pairs to form bearing-walls to the slots, one plate of each pair having an elongated slot to allow of ready adjustment, and a securing-screw, as $h$, as and for the purposes set forth.

5. The combination, with a miter-box, as described, having its base extend beyond the ends of its sides, of metal plates C, secured to the ends of said sides, and having vertical bearing-faces $c$, arranged at right angles to the longitudinal plane of the box, as set forth.

6. The combination, with a miter-box, of folding or otherwise movable arms carried at or near one edge of the box, and arranged to be projected and engaged with the edge of a bench or table or to be thrown back within the limits of the box at will, as specified.

L. H. OLMSTED.

Witnesses:
FRANK A. OLMSTED,
LENA GIEBNER.